(12) United States Patent
Robards

(10) Patent No.: US 9,032,920 B2
(45) Date of Patent: May 19, 2015

(54) AXIAL PISTON INTERNAL COMBUSTION ENGINE USING AN ATKINSON CYCLE

(71) Applicant: Brian Michael Robards, Camas, WA (US)

(72) Inventor: Brian Michael Robards, Camas, WA (US)

(73) Assignee: Brian Robards, Camas, WA (US)

( * ) Notice: Subject to any disclaimer, the term of this patent is extended or adjusted under 35 U.S.C. 154(b) by 0 days.

(21) Appl. No.: 13/732,436

(22) Filed: Jan. 1, 2013

(65) Prior Publication Data

US 2014/0182526 A1 Jul. 3, 2014

Related U.S. Application Data

(60) Provisional application No. 61/582,398, filed on Jan. 1, 2012.

(51) Int. Cl.
| | | |
|---|---|---|
| F02B 75/18 | (2006.01) | |
| F02B 75/28 | (2006.01) | |
| F01B 1/10 | (2006.01) | |
| F01B 1/12 | (2006.01) | |
| F02B 75/26 | (2006.01) | |
| F01B 3/04 | (2006.01) | |
| F01B 9/06 | (2006.01) | |

(52) U.S. Cl.
CPC .................. *F02B 75/28* (2013.01); *F01B 3/045* (2013.01); *F01B 9/06* (2013.01); *F01B 1/10* (2013.01); *F01B 1/12* (2013.01); *F01B 3/04* (2013.01); *F02B 75/26* (2013.01)

(58) Field of Classification Search
CPC ............ F02B 75/26; F02B 75/28; F01B 9/06; F01B 3/04; F01B 3/045
USPC ....................................................... 123/56.2
See application file for complete search history.

(56) References Cited

U.S. PATENT DOCUMENTS

| | | | | |
|---|---|---|---|---|
| 2,243,821 A | * | 5/1941 | Herrmann | 74/56 |
| 3,986,436 A | * | 10/1976 | Kaufman et al. | 91/502 |
| 6,202,606 B1 | * | 3/2001 | Anttila | 123/56.1 |
| 6,213,733 B1 | * | 4/2001 | Obrist et al. | 417/319 |
| 2007/0163523 A1 | * | 7/2007 | Miyazato et al. | 123/90.16 |
| 2007/0261547 A1 | * | 11/2007 | Liebherr et al. | 92/12.2 |
| 2008/0105224 A1 | * | 5/2008 | Kubes et al. | 123/56.1 |
| 2008/0168962 A1 | * | 7/2008 | Szilvasi | 123/190.6 |
| 2011/0011368 A1 | * | 1/2011 | Raether | 123/197.4 |

* cited by examiner

*Primary Examiner* — Lindsay Low
*Assistant Examiner* — Charles Brauch

(57) ABSTRACT

An axial piston internal combustion engine designed to improve the thermal efficiency of the engine by utilizing a sine wave/connecting rod assembly (5) to cause the piston (6) of the engine to travel vertically parallel to the engine's main shaft (13). The upper sine wave barrel (2) and lower sine wave barrel (3) have a channel in them that the cylindrical ends of the connecting rod (4) travel in, forcing the connecting rod (4) and piston (6) to travel vertically. The engine also utilizes slide valve (20) that has slots in it that when slid past the ports of the upper cylinder head (18) and lower cylinder head (19) controls the intake and exhaust timing events of the engine. The channel in the upper sine wave barrel (2) and lower sine wave barrel (3) is designed such that the vertical expansion/exhaust strokes of the engine are longer than the intake/compression strokes which allow the engine to make more efficient use of the energy produced by combusting the fuel, improving the thermal efficiency of the engine. The design also reduces the friction between the cylinder walls and piston (4) and the friction associated with typical engines valvetrain components, improving the overall efficiency of the engine. By reducing the frictional losses and improving the thermal efficiency the new engine should have decreased fuel consumption.

11 Claims, 14 Drawing Sheets

Upper isometric view of the sine wave/connecting rod assembly, piston, thrust bearing, main bearings, and connecting rod busing installed into engine block

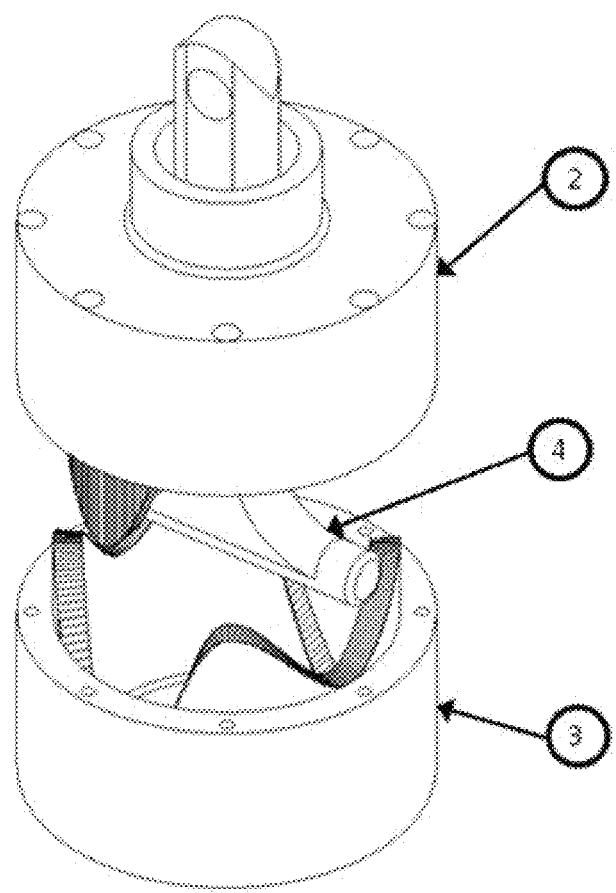
Figure 1: Exploded view of sine wave/connecting rod assembly

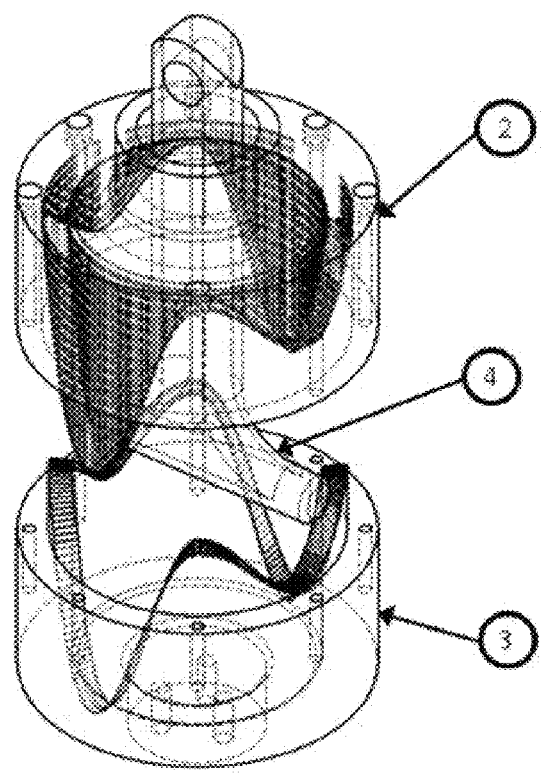
Figure 2: Exploded view of sine wave/connecting rod assembly, with hidden lines

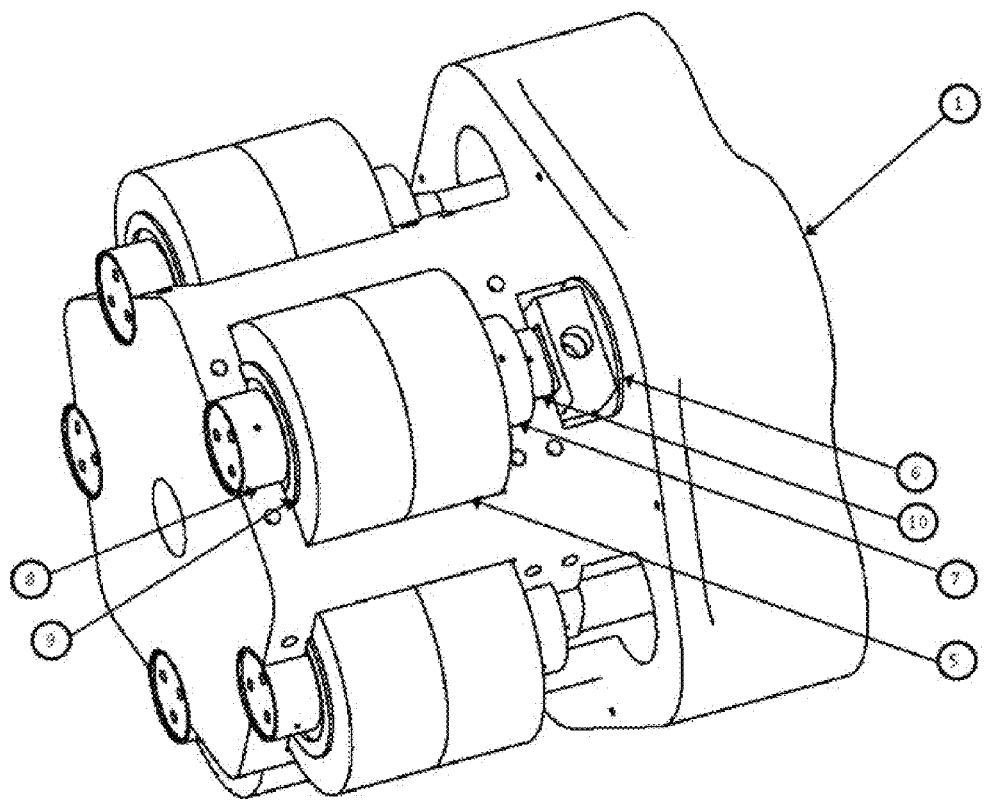
Figure 3: Upper isometric view of the sine wave/connecting rod assembly, piston, thrust bearing, main bearings, and connecting rod busing installed into engine block

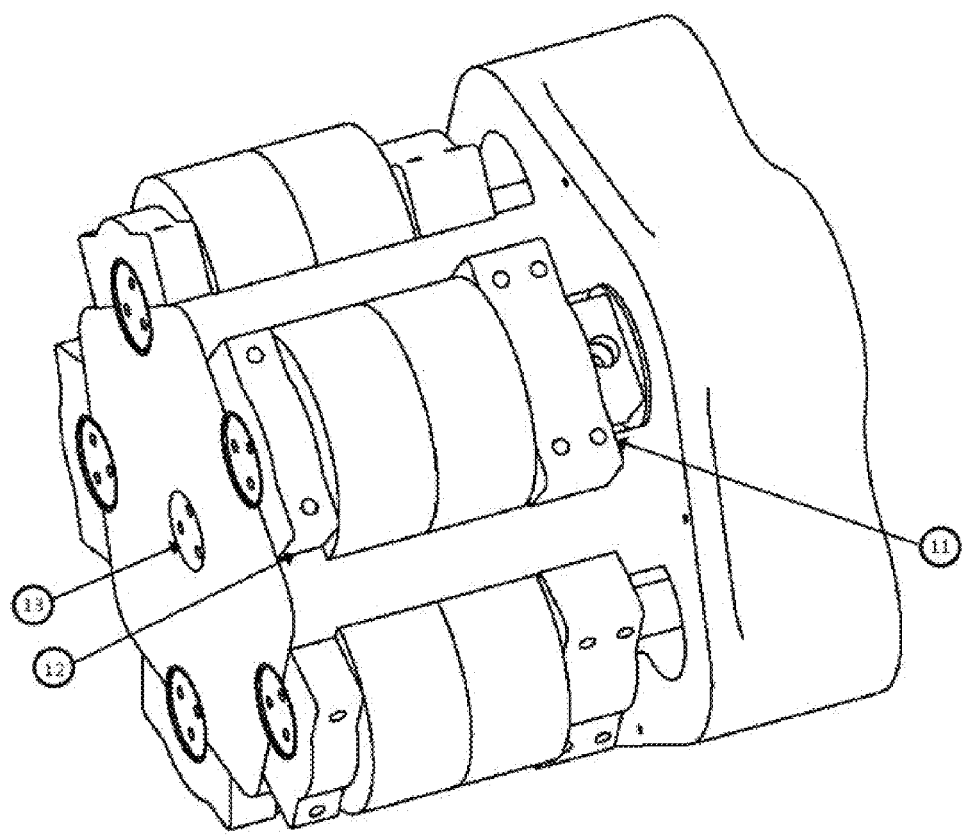
Figure 4: Upper isometric view of the upper bearing cap, lower bearing car and main shaft installed on engine

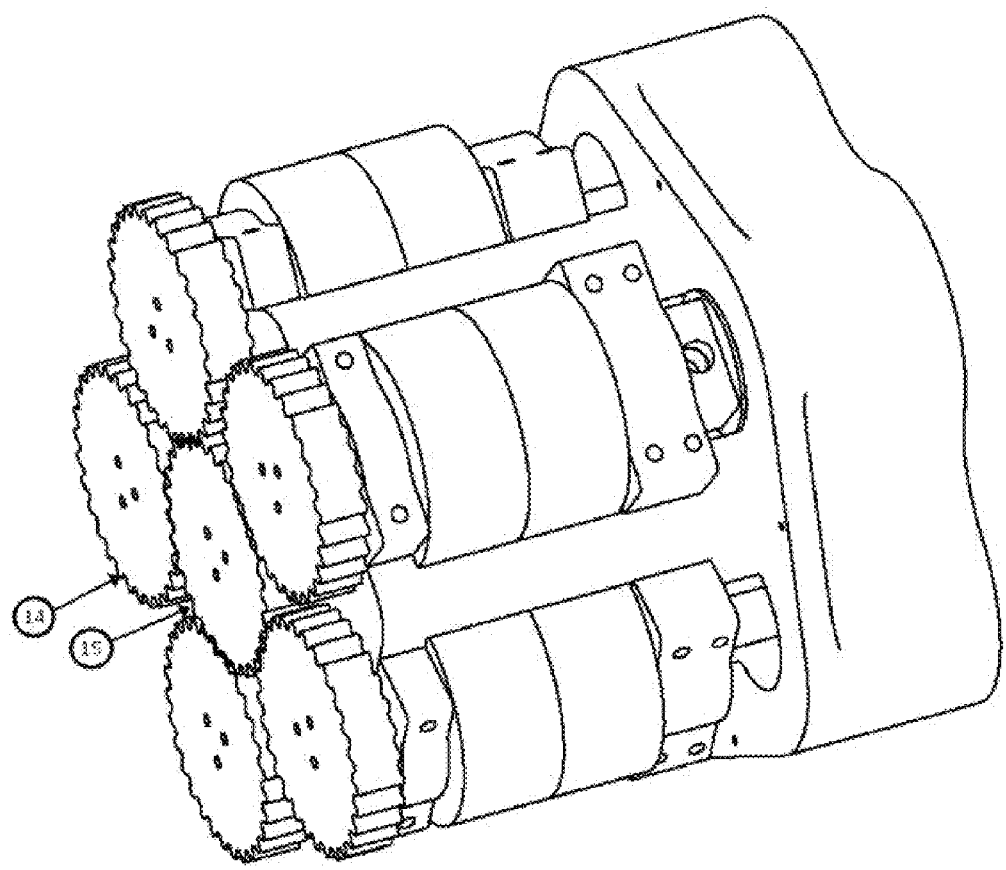
Figure 5: Upper isometric view of the cylinder gears and main gears installed

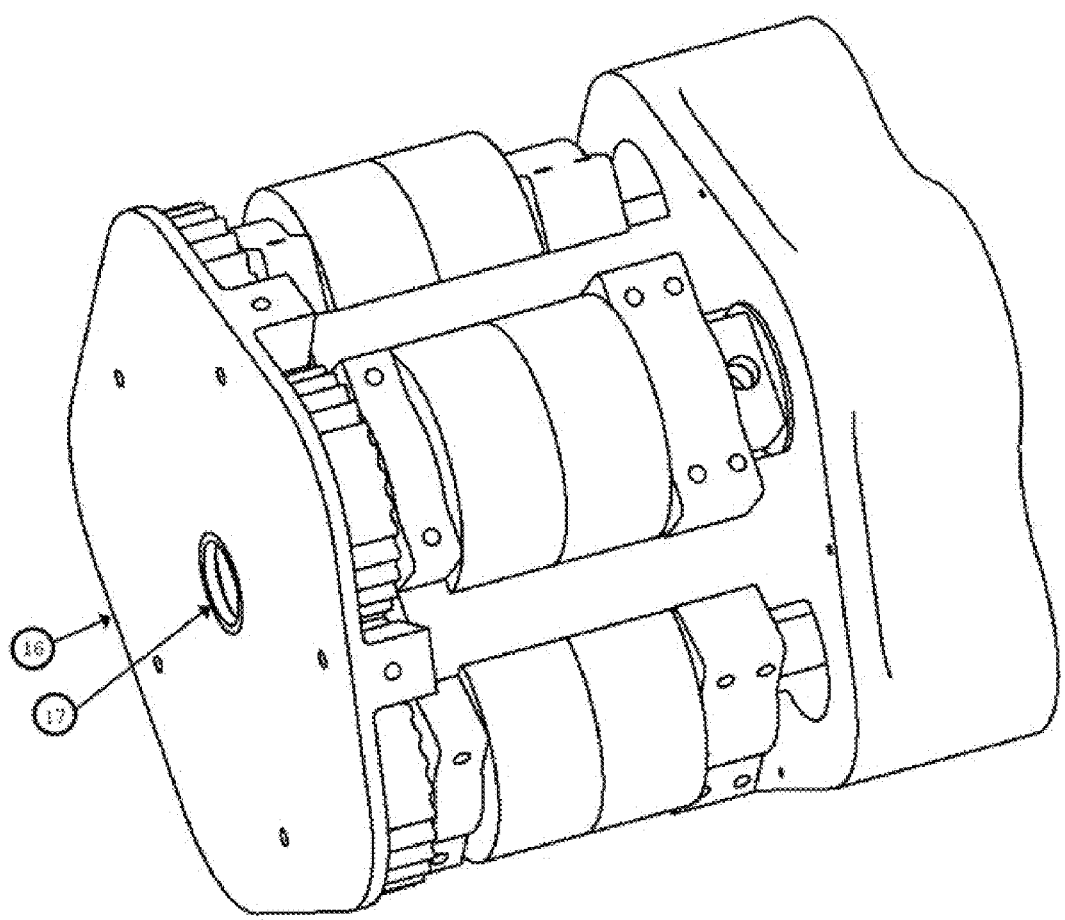
Figure 6: Upper isometric view of the main seal plate and the main oil seal installed

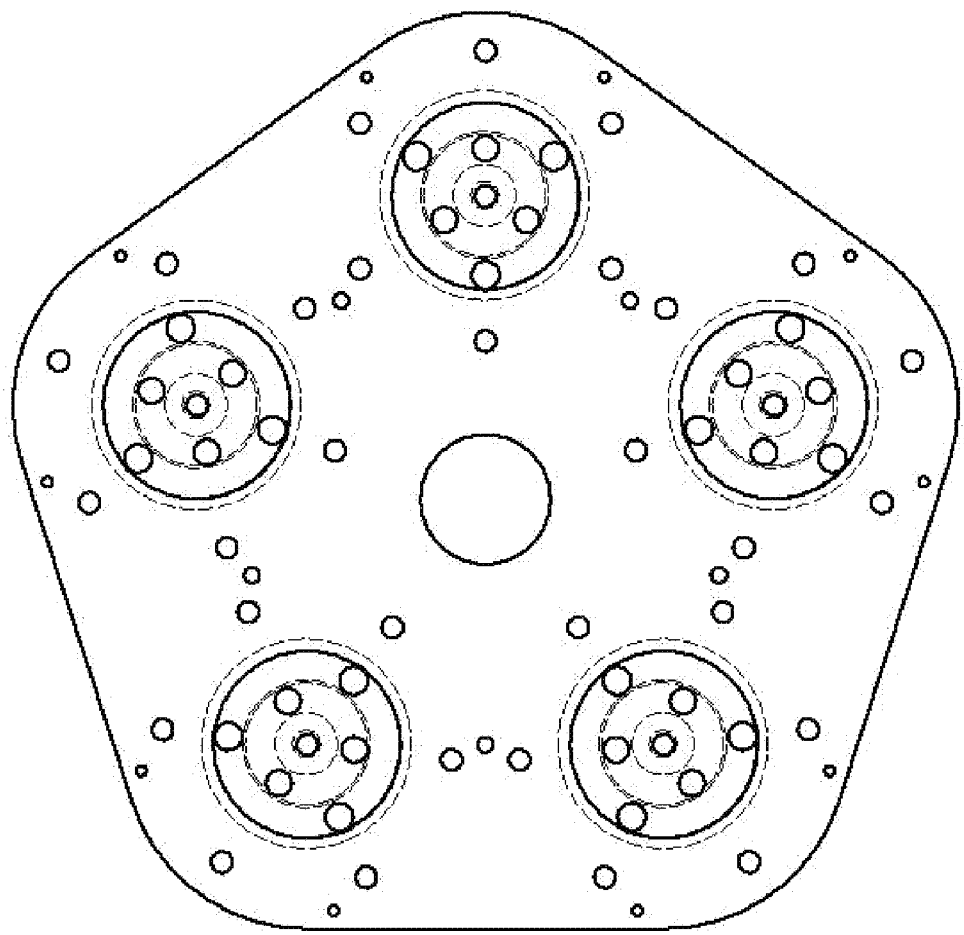
Figure 7: Bottom view of the lower cylinder head (19)

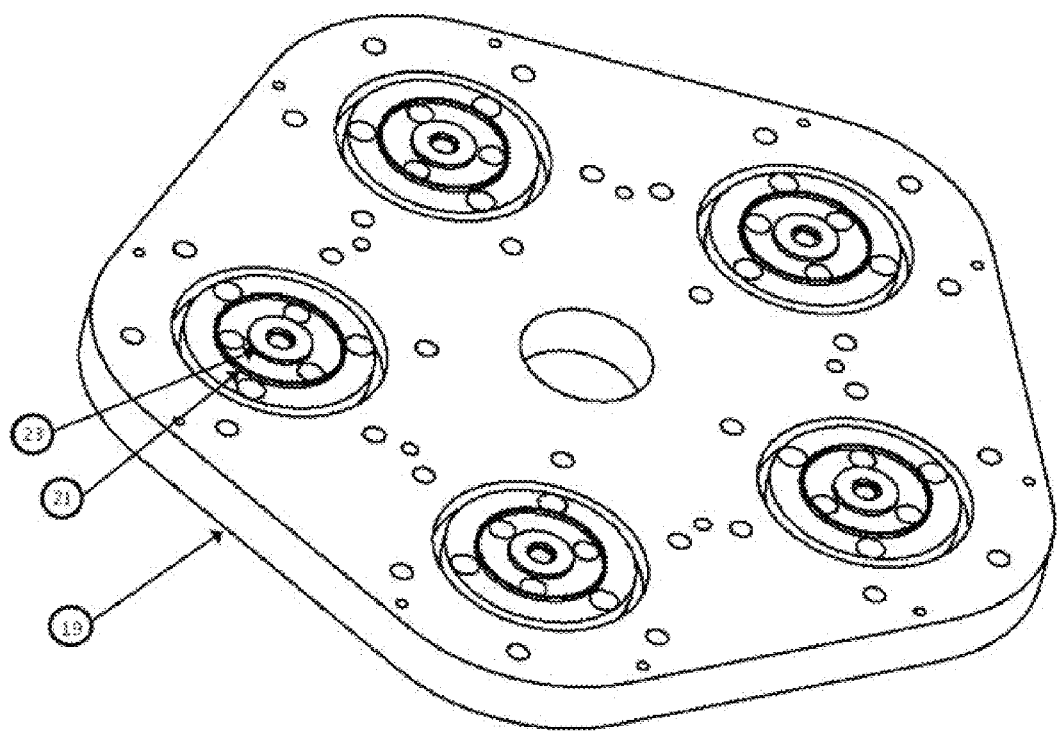
Figure 8: Upper isometric view of the lower cylinder head with the roller bearings and cylinder head sealing rings installed

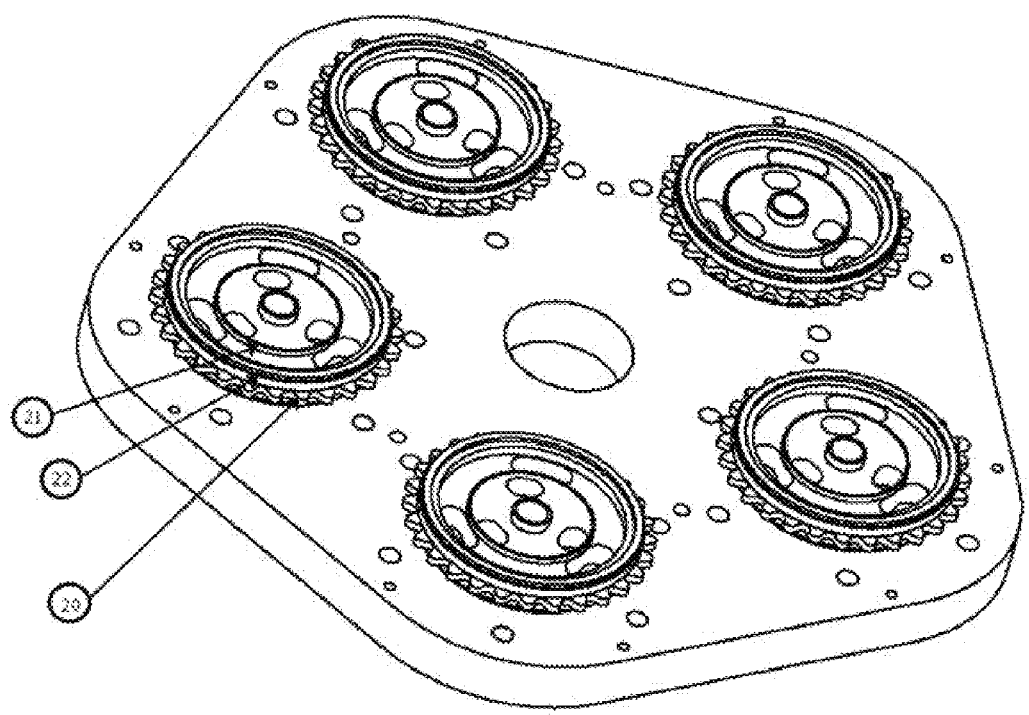
Figure 9: Upper isometric view of the lower cylinder head with the slide valves, upper roller bearings and cylinder head sealing rings installed

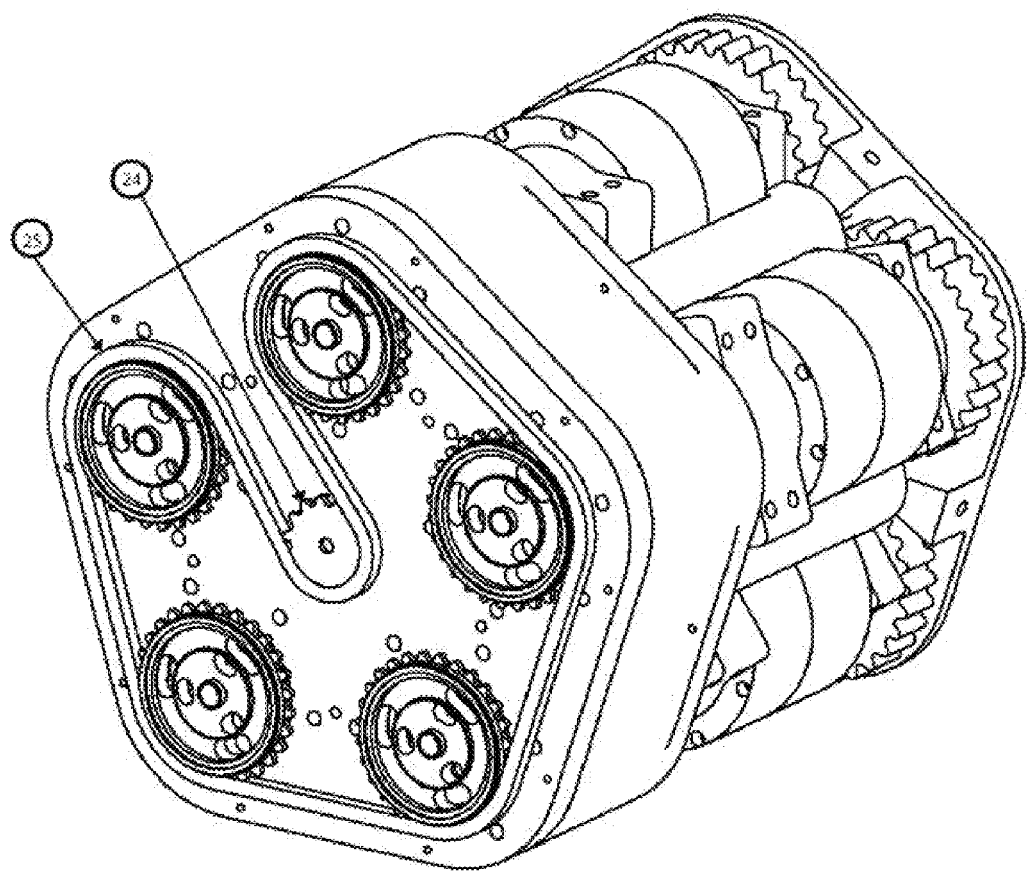
Figure 10: Isometric view of the lower cylinder head installed onto the engine block with the main slide valve gear and timing chain installed

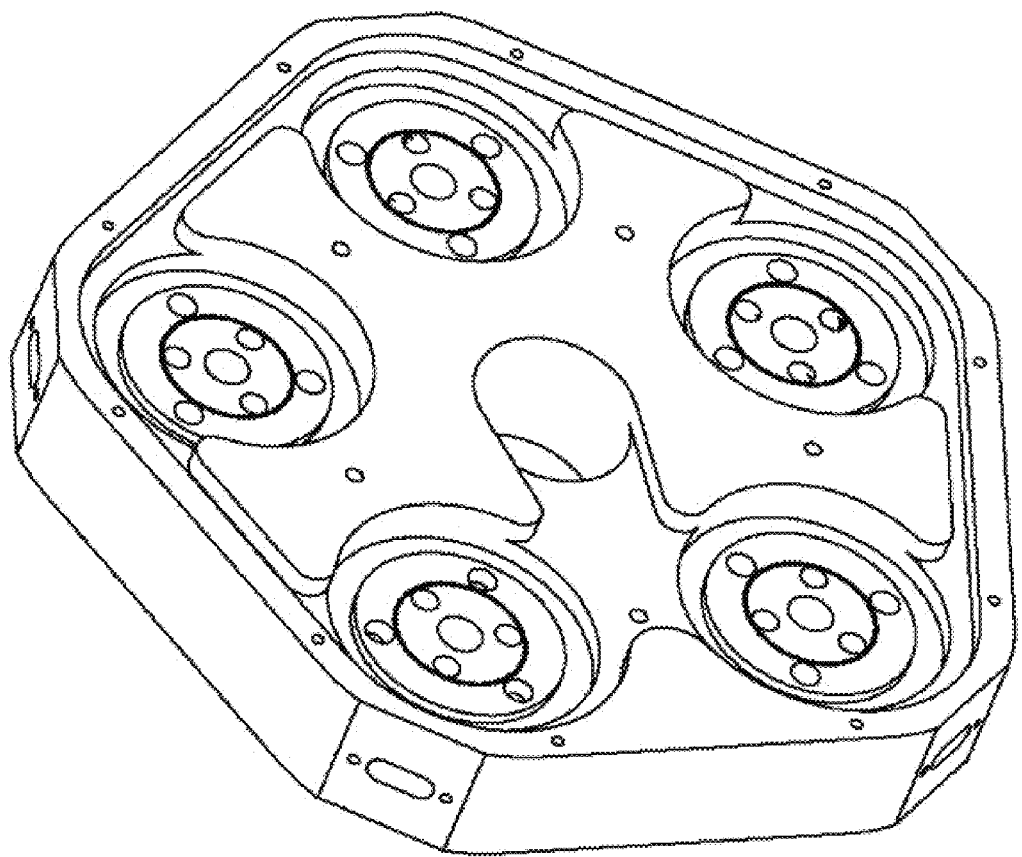
Figure 11: Lower isometric view of the upper cylinder head (18)

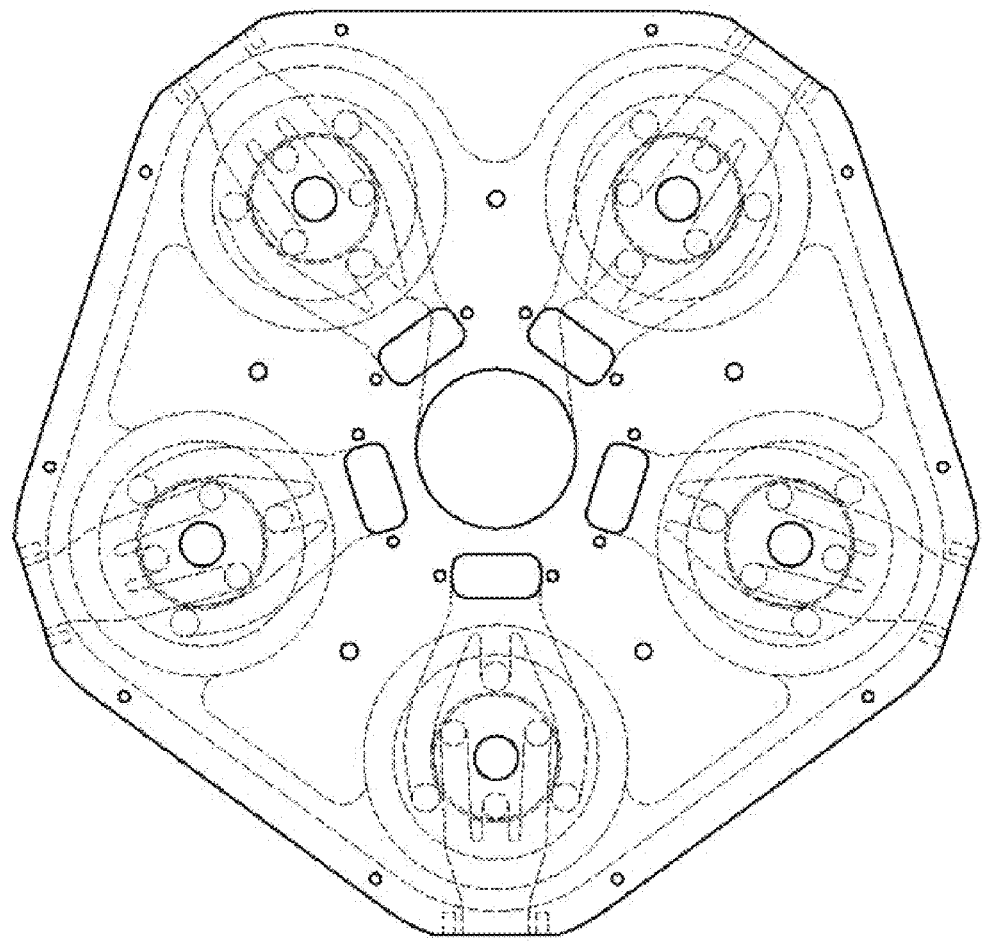
Figure 12: Top view of the upper cylinder head (18) with hidden lines showing the internal intake and exhaust port configuration

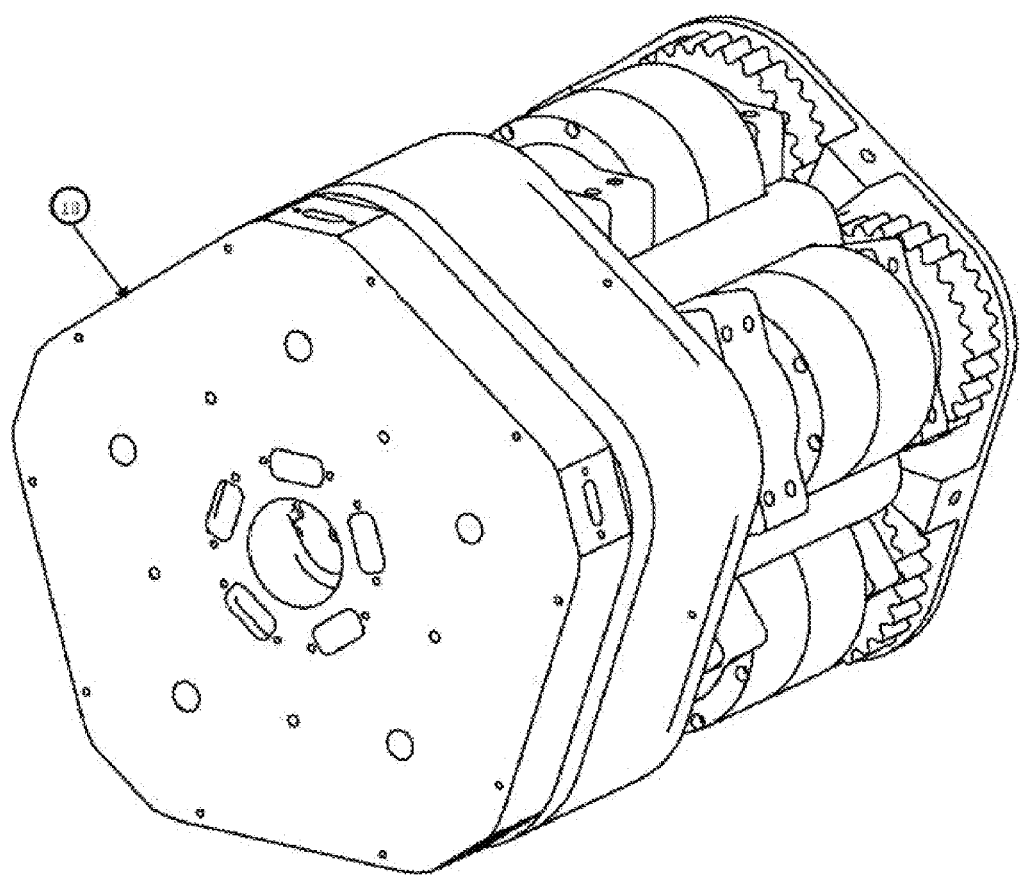
Figure 13: Isometric view of the engine with the upper cylinder head installed

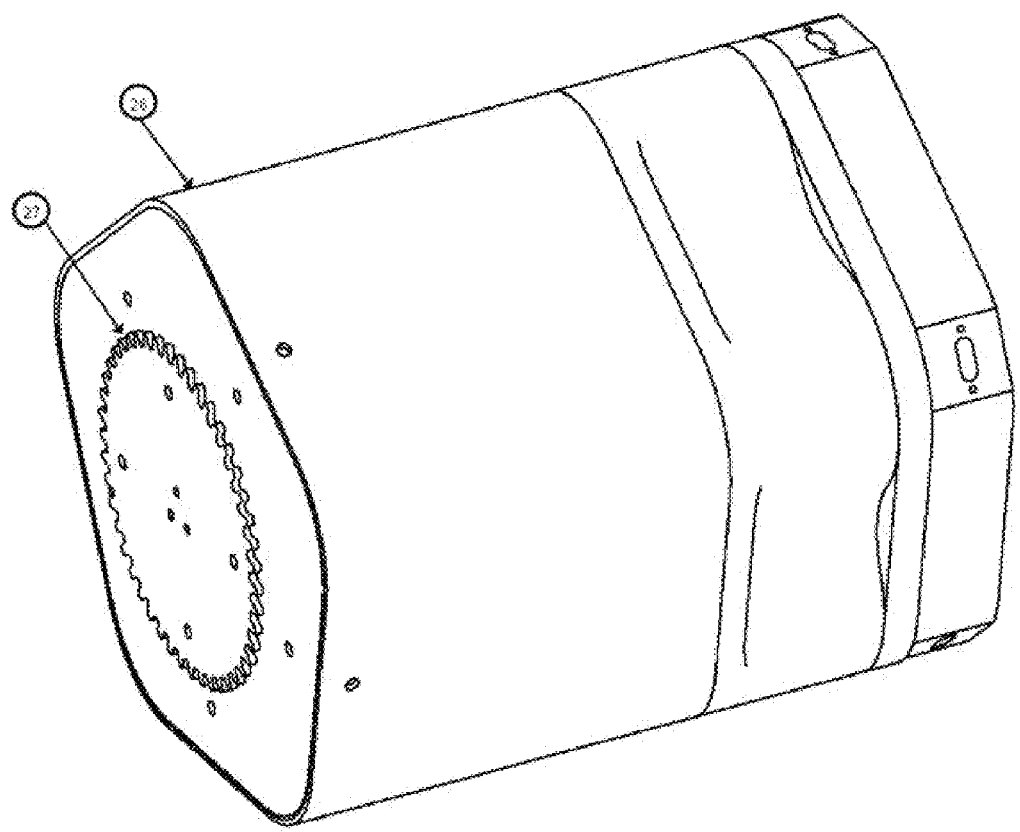
Figure 14: Isometric view of the engine with the block cover and flywheel installed

AXIAL PISTON INTERNAL COMBUSTION ENGINE USING AN ATKINSON CYCLE

CROSS-REFERENCE TO RELATED APPLICATIONS

This application claims the benefits of provisional patent application Ser. No 61582398 filed Jan. 1, 2012 by the present inventor.

SEQUENCE LISTING

None

BACKGROUND

Prior Art

The following is a tabulation of some prior art that presently appears relevant:

| US Patents | | |
|---|---|---|
| Pat. No. | Issue Date | Patentee |
| 6,202,606 | Mar. 20, 2001 | Anttila |
| 2010/0180868 | Jul. 22, 2010 | Scalzo |
| 4,944,261 | Jul. 31, 1990 | Coates |

This relates to internal combustion engines, specifically four stroke internal combustion engines which utilize an axial piston arrangement. Four stroke internal combustion engines tend to not use all of the thermal energy of the fuel that they burn to produce power, if the engines were to be designed in a way which would improve the thermal efficiency the power produced would increase and the fuel consumption would decrease. The issues with most four stroke internal combustion engines is that during the power stroke the piston expansion ratio is limited by the engine architecture, this results in the pressure resulted from the energy of the burned fuel not being able to produce the optimum amount of power. In these engines when the piston has reached its lowest point in the power stroke the exhaust valve is opened and the excess cylinder pressure escapes from the engine as engine exhaust. Engine manufacturers have experimented with various means of engine design which could act to make more efficient use of the fuels energy.

U.S. Pat. No. 6,202,606 to Anttila (2001) shows an axial piston engine. This engine uses a thrust yoke arrangement and six pistons arranged radially around a central output shaft. This engine is designed such that the pistons and the output shaft are arranged parallel to each other. This engine design was such that the lengths of the intake/compression and expansion/exhaust strokes were the same so it did not benefit from the thermodynamic advantages of overexpansion.

U.S. Pat. No. 2010/0180868 to Scalzo (2010) shows an engine design that uses a rocker mechanism to actuate vertical movement of a piston in the engine's cylinder. The rocker mechanism is uses such that it produces an intake/compression stroke that is shorter than the expansion/exhaust stoke allowing this engine design to have an increased thermal efficiency due the overexpansion present. The rocker mechanism that is used to actuate the piston movement is rather complex and would add a significant amount of cost to the production of the engine.

U.S. Pat. No. 4,944,261 to Coates (1990) show a rotary valve assembly used in internal combustion engines to actuate the air intake and exhaust events of the engine. This design uses a rotary valve mounted on a shaft which have ports in the rotary valve, which when rotated allow air to enter and exit the combustion chamber of the engine through these ports. By using these rotary valves instead of the standard valvetrain components (poppet valve, valve springs, rocker arms, pushrods, etc) the engine will experience less frictional losses. The typical valvetrain components are also known to have natural frequency issues that limit the speed at which they can operate, the use of the rotary valves will eliminate these natural frequency issues and allow the engine to operate at higher engine speeds.

SUMMARY

An improved four stoke internal combustion engine is designed such that the distance that the piston travels during the intake/compression stroke are much less than the distance travelled during the expansion/exhaust stroke. Each cylinder of the engine has the piston movement activated by a barrel that is split into two halves, which have channel in the shape of a sinusoidal wave. The circular ends of the connecting rods can slide through this sinusoidal shaped wave in the barrel. As the barrel rotates the connecting rod is forced to move vertically by this channel, and the channel is designed such that the shape is mirrored about the center point so that both ends of the connecting rod always have the same vertical position. The channel in the barrel is shaped such that the sinusoidal wave associated with the intake/compression strokes have smaller amplitude than the sinusoidal wave associated with the expansion/exhaust strokes.

The improved engine has five cylinders which are arranged radially around a center main shaft. Each cylinder barrel has a timing gear attached to it which spins to rotate a main timing gear. As the main timing gear rotates it is attached to a main shaft which acts to rotate a main slide valve gear in between the upper and lower cylinder head. Each cylinder of the engine has a slide valve which is mounted between the upper and lower cylinder heads that are driven off of the main slide valve gear. As the slide valves rotate they have ports in them which are used to allow air into the engine through the intake ports and allow exhaust to escape from the engine through the exhaust ports. A typical engine uses poppet valves which are activated by a camshaft and various lifters/pushrods/cam followers/etc, these parts act to increase the friction in the engine and reduce the overall engine efficiency. The use of the slide valve should act to reduce the overall engine friction and improve efficiency.

ADVANTAGES

Accordingly several advantages of one or more aspects are as follows: to provide an internal combustion engine which utilizes the pressure from fuel combustion more efficiently by utilizing an expansion ratio which is greater than its compression ratio, which results in improved fuel efficiency. Because the connecting rod is always parallel to the cylinder, there is no side loading of the piston, resulting in a reduction in friction losses between the cylinder and piston. This engine design allows for two complete combustion events per rotation of the wave barrel, while a traditional crankshaft/connection rod/piston engine requires two crankshaft rotations to complete a complete combustion cycle, by having four times the combustion events per rotation this engine design will have a torque output which is four time greater than a traditional engine of equal displacement.

DRAWINGS—FIGURES

FIG. 1: Exploded view of sine wave/connecting rod assembly (4)

FIG. 2: Exploded view of sine wave/connecting rod assembly (4), with hidden lines FIG. 3: Upper isometric view of the sine wave/connecting rod assembly, piston, thrust bearing, main bearings, and connecting rod busing installed into engine block FIG. 4: Upper isometric view of the upper bearing cap, lower bearing car and main shaft installed on engine FIG. 5: Upper isometric view of the cylinder gears and main gears installed FIG. 6: Upper isometric view of the main seal plate and the main oil seal installed FIG. 7: Bottom view of the lower cylinder head (19)

FIG. 8: Upper isometric view of the lower cylinder head with the roller bearings and cylinder head sealing rings installed FIG. 9: Upper isometric view of the lower cylinder head with the slide valves, upper roller bearings and cylinder head sealing rings installed FIG. 10: Isometric view of the lower cylinder head installed onto the engine block with the main slide valve gear and timing chain installed FIG. 11: Lower isometric view of the upper cylinder head (18)

FIG. 12: Top view of the upper cylinder head (18) with hidden lines showing the internal intake and exhaust port configuration FIG. 13: Isometric view of the engine with the upper cylinder head installed FIG. 14: Isometric view of the engine with the block cover and flywheel installed

DRAWINGS—REFERENCE NUMERALS

1) Engine Block
2) Upper Sine Wave Barrel
3) Lower Sine Wave Barrel
4) Connecting Rod
5) Sine Wave/Connecting Rod Assembly
6) Piston
7) Upper Main Bearing
8) Lower Main Bearing
9) Thrust Bearing
10) Connecting Rod Bushing
11) Upper Main Cap
12) Lower Main Cap
13) Main Shaft
14) Cylinder Gear
15) Main Gear
16) Main Seal Plate
17) Main Oil Seal
18) Upper Cylinder Head
19) Lower Cylinder Head
20) Slide Valve
21) Cylinder Head Sealing Ring
22) Upper Roller Bearing
23) Lower Roller Bearing
24) Main slide valve gear
25) Timing Chain
26) Block Cover
27) Flywheel

DETAILED DESCRIPTION

FIG. 1 is an exploded view of the sine wave/connecting rod assembly (4) which shows the sinusoidal shaped channel in the upper sine wave barrel (2) and lower sine wave barrel (3) and the T-shaped connecting rod (4) which has the two opposing circular ends that ride inside of these channels.

FIG. 2 is an exploded view similar to FIG. 1 which shows the complete shape of the sinusoidal channels in the upper since wave barrel (2) and the lower sine wave barrel (3).

FIG. 3 is an upper rear isometric view showing the engine block (1) with the five radially positioned cylinders. Each cylinder has the sine wave/connecting rod assembly (4) installed using a lower main bearing (8), upper main bearing (7) and two thrust bearings (9) mounted both above and below the sine wave/connecting rod assembly (4) for each cylinder. This figure also shows that a piston (6) is installed in each cylinder and a connecting rod bushing (10) is installed around the connecting rod of each cylinder. The connecting rod bushing (10) is used to prevent the connecting rod (4) and piston (6) from rotating in the cylinder.

FIG. 4 is an upper rear isometric view showing the engine block (1) with the upper main cap (12) and lower main cap (11) installed for each cylinder. This figure also shows the main shaft (13) installed through the cavity in the center of the engine block.

FIG. 5 is an upper rear isometric view showing the cylinder gear (14) mounted onto the sine wave/connecting rod assembly (4) for each cylinder as well as the main gear (15) mounted onto the main shaft (13). In this figure we see that the main gear (15) and the cylinder gears (14) have the same diameter so that one complete rotation of each sine wave/connecting rod assembly (4) cause one complete rotation of the main shaft (13).

FIG. 6 is an upper rear isometric view showing the main seal plate (16) mounted onto the engine block (1) with the main oil seal (17) installed in the circular cavity in the middle of the main seal plate. This oil seal is used to prevent oil from escaping the engine when the flywheel is installed.

FIG. 7 is a bottom view of the lower cylinder head (19); we see that each cylinder has six ports arranged radially around a center fuel injector hole. The inside three ports are used to allow exhaust to escape the engine during the exhaust stroke, and the outside three ports are used to allow air to enter the engine during the intake stroke.

FIG. 8 is an upper isometric view of the top part of the lower cylinder head (19) showing cylinder head sealing ring (21) and lower roller bearing (23) installed for each cylinder. The cylinder head sealing ring sits in a channel in the lower cylinder head and a channel in the slide valve and acts to prevent air from the exhaust ports and intake ports from mixing. The lower roller bearing allows the slide valve to rotate about its center axis with minimal friction.

FIG. 9 is an upper isometric view of the lower cylinder head showing the slide valve (20) installed with the cylinder head sealing ring (21) and upper roller bearing (22) installed for each cylinder. The cylinder head sealing ring sits in a channel in the upper cylinder head and a channel in the slide valve and acts to prevent air from the exhaust ports and intake ports from mixing. The upper roller bearing allows the slide valve to rotate about its center axis with minimal friction.

FIG. 10 is an upper isometric view showing the lower cylinder head (19) installed onto the engine block (1). This figure also shows the main slide valve gear (24) mounted onto the main shaft (13) and the timing chain (25) installed.

FIG. 11 is a lower isometric view of the upper cylinder head (18) showing the six ports for each cylinder which line up with the six ports that are in the lower cylinder head (19). We can also see the channel located around each cylinder which will allow the timing chain (25) to connect each cylinder's slide valve (20) to the main slide valve gear (24).

FIG. 12 is a top view of the upper cylinder head with hidden lines shown. The hidden lines allow us to see the internal pathways which allow the three intake ports and the three exhaust ports to be connected to a single intake and exhaust manifold port for each cylinder.

FIG. 13 is an upper isometric view slowing the upper cylinder head (18) mounted onto the rest of the engine.

FIG. 14 is an upper rear isometric view showing the flywheel (27) mounted onto the main gear (15) and the block cover (26) mounted onto the engine block (1).

Operation

In operation this engine is designed such that it can make optimum use of the fuels energy by minimizing frictional losses and maximizing the thermal efficiency from the fuel. This engine accomplishes this by:

1. When the fuel is combusted the pressure from the combustion forces the piston (6) downward which is connected to the connecting rod (4). When the connecting rod (4) moves downward it forces the barrel assembly, made up of the upper sine wave barrel (2) and lower sine wave barrel (3), to rotate and produce a rotational torque.
2. As the barrel assemblies rotate they will rotate each of the cylinder gears (14) which are meshed with the main gear (15) causing a rotational torque about the main shaft (13). The main gear will also cause a rotational torque to be caused about the flywheel (27).
3. As the main shaft rotates it will cause the main slide valve gear (24) to rotate, which will then cause each cylinder's slide valves (20) to rotate via the timing chain (25).
4. The slide valves (20) are located in between the lower cylinder head (19) and upper cylinder head (18), and the slide valves (20) have slots in them such that as the slide valves (20) rotate the slots rotate past the ports in the upper cylinder head (18) and lower cylinder head (19) precisely controlling when the air enters the engine and when the exhaust exits the engine.
5. The cylinder head sealing rings (21) are located between the slide valve (20) and upper cylinder head (18) and between the slide valve (20) and the lower cylinder head (19). These sealing rings act to separate the exhaust ports from the intake ports, ensuring that air does not mix between the intake and exhaust.
6. The channel in the upper sine wave barrel (2) and the lower sine wave barrel (3) is designed such that the cylindrical ends of the connecting rods (4) can travel between the two barrel halves. The channel is designed such that the vertical movement of the connecting rod (4) and piston (6) during the intake/compression strokes of the engine is much less than the vertical movement of the connecting rod (4) and piston (6) during the expansion/exhaust strokes.

Conclusions, Ramifications And Scope

Accordingly the reader will see that the axial piston engine utilizing an Atkinson cycle can result in an engine which is superior to existing engine technologies because it will result in increased thermal efficiency, reduced frictional losses and significantly higher torque output for a given displacement. Furthermore the axial piston engine has the additional advantages in that:

It can be used with a broad ranges of fuels including gasoline, diesel fuel, natural gas, and ethanol It can be scaled in size depending on the application for which the engine is going to be used It provides improved fuel efficiency as compared to a traditional crankshaft/connecting rod/piston engine.

the number of cylinders utilized can be varied from one cylinder to five cylinders depending on the application for which the engine is going to be used Although the description above contains many specifications, these should not be construed as limiting the scope of the embodiments but as merely providing illustrations of some of the several embodiments.

Thus the scope of the embodiments should be determined by the appended claims and their legal equivalents, rather than examples given.

The invention claimed is:

1. An axial piston engine, comprising:
a main shaft;
a main gear in connection with the main shaft;
a plurality of connecting rods, each connecting rod having a proximal end and a distal T-shaped end;
a plurality of pistons within cylinders, each piston connected to the proximal end of a connecting rod, and each connecting rod, piston and cylinder parallel to and axially arranged around a center of the main shaft;
a plurality of connecting rod bushings for preventing rotation of the connecting rods with T-shaped ends and the pistons, each connecting rod bushing around the proximal end of the each connecting rod;
a plurality of sine wave barrels, each sine wave barrel in connection with the distal T-shaped end of a connecting rod;
a plurality of cylinder gears, each cylinder gear in connection with a sine wave barrel and the main gear;
a two piece cylinder head, each cylinder head having a plurality of slide valve gears to actuate intake and exhaust timing events of the engine,
wherein motion of the pistons and the distal T-shaped end of the connecting rods rotate the sine wave barrels, wherein each piston travels a shorter distance during an intake and compression stroke and a longer distance during an expansion and exhaust stroke of a combustion cycle, and wherein the plurality of sine wave barrels rotate the main gear which rotates the main shaft.

2. The axial piston engine of claim 1, wherein the engine completes two combustion cycles for every rotation of the plurality of sine wave barrels.

3. The axial piston engine of claim 1, wherein the engine is an internal combustion engine, a compressor, or a pump.

4. The axial piston engine of claim 1, wherein each sine wave barrel comprises an upper sinusoidal shaped section and a lower sinusoidal shaped section, wherein the upper and lower sinusoidal shaped sections form a sinusoidal channel.

5. The axial piston engine of claim 4, wherein the sinusoidal channel is mirrored about a center point of the sine wave barrel so that both ends of the distal T-shaped connecting rod have the same vertical position.

6. The axial piston engine of claim 5, wherein the distal T-shaped end of a connecting rod has two opposing circular ends that ride inside the sinusoidal channel and thereby rotate the sine wave barrel.

7. The axial piston engine of claim 4, wherein the sinusoidal channel is shaped such that a sinusoidal wave associated with an intake and compression stroke has smaller amplitude than a sinusoidal wave associated with an expansion and exhaust stroke.

8. The axial piston engine of claim 1, wherein the engine comprises five pistons and five cylinders.

9. The axial piston engine of claim 6, wherein the slide valve gears are located between an upper cylinder head and a lower cylinder head; and wherein the slide valve gears have slots and the upper cylinder head and the lower cylinder head have ports.

10. The axial piston engine of claim 9, further comprising a main slide valve gear in connection with the main shaft; and a timing chain in connection with the main slide valve gear and the slide valve gears.

11. The axial piston engine of claim 10, wherein rotation of the main shaft rotates the main slide valve gear, the timing chain, and the slide valve gears, wherein the slots in the slide valve gears rotate past the ports in the upper cylinder head and the lower cylinder head, which precisely controls air entering the engine and exhaust leaving the engine.

* * * * *